(12) United States Patent
Filatov

(10) Patent No.: US 7,557,480 B2
(45) Date of Patent: Jul. 7, 2009

(54) COMMUNICATING MAGNETIC FLUX ACROSS A GAP WITH A ROTATING BODY

(75) Inventor: Alexei V. Filatov, Fullerton, CA (US)

(73) Assignee: Calnetix, Inc., Cerritos, CA (US)

( * ) Notice: Subject to any disclaimer, the term of this patent is extended or adjusted under 35 U.S.C. 154(b) by 158 days.

(21) Appl. No.: 11/697,253

(22) Filed: Apr. 5, 2007

(65) Prior Publication Data
US 2008/0246373 A1  Oct. 9, 2008

(51) Int. Cl.
*H02K 7/09* (2006.01)
*H02K 23/66* (2006.01)
(52) U.S. Cl. .................................... 310/90.5; 310/68 B
(58) Field of Classification Search ............... 310/90.5, 310/74, 181, 178, 68 B
See application file for complete search history.

(56) References Cited

U.S. PATENT DOCUMENTS

| | | | | |
|---|---|---|---|---|
| 4,358,697 A * | 11/1982 | Liu et al. | ............... | 310/156.84 |
| 5,514,924 A | 5/1996 | McMullen et al. | | |
| 5,942,829 A | 8/1999 | Huynh | | |
| 6,130,494 A | 10/2000 | Schöb | | |
| 6,148,967 A | 11/2000 | Huynh | | |
| 6,304,015 B1 | 10/2001 | Filatov et al. | | |
| 6,465,924 B1 * | 10/2002 | Maejima | ..................... | 310/90.5 |
| 6,664,680 B1 * | 12/2003 | Gabrys | ......................... | 310/74 |
| 6,700,258 B2 | 3/2004 | McMullen et al. | | |
| 6,727,617 B2 | 4/2004 | McMullen et al. | | |
| 6,794,780 B2 * | 9/2004 | Silber et al. | ................. | 310/90.5 |
| 6,856,062 B2 * | 2/2005 | Heiberger et al. | ........... | 310/178 |
| 6,897,587 B1 | 5/2005 | McMullen et al. | | |
| 7,042,118 B2 | 5/2006 | McMullen et al. | | |
| 2005/0093391 A1 | 5/2005 | McMullen et al. | | |
| 2007/0063594 A1 | 3/2007 | Huynh | | |

OTHER PUBLICATIONS

McMullen, Patrick T. et al., "*Design and Development of a 100 KW Energy Storage Flywheel for UPS and Power Conditioning Applications,*" 24th International PCIM Conference, Nuremberg, Germany, May 20-22, 2003, 6 pages.

(Continued)

*Primary Examiner*—Chandrika Prasad
(74) *Attorney, Agent, or Firm*—Fish & Richardson P.C.

(57) ABSTRACT

An electromagnetic actuator includes a body having a rotational axis, a first pole adjacent an end facing surface of the body, and a second pole adjacent a lateral facing surface of the body. The poles are adapted to communicate magnetic flux with the body. The body, the first pole, and the second pole define an axial magnetic control circuit. The actuator includes a plurality of radial poles adjacent the lateral facing surface of the body and adapted to communicate magnetic flux with the body. The body and the plurality of radial poles define a plurality of radial magnetic control circuits. The plurality of radial poles are adapted to communicate magnetic fluxes with the body and at least one of the first pole or the second pole. The body, the plurality of radial poles, and at least one of the first pole or the second pole define a magnetic bias circuit.

21 Claims, 6 Drawing Sheets

OTHER PUBLICATIONS

Hawkins, Lawrence A. et al., "*Analysis and Testing of a Magnetic Bearing Energy Storage Flywheel with Gain-Scheduled, Mimo Control,*" Proceedings of ASME Turboexpo 2000, Munich, Germany, May 8-11, 2000, pp. 1-8.

Huynh, Co et al., "*Flywheel Energy Storage System for Naval Applications,*" GT 2006-90270, Proceedings of GT 2006 ASME Turbo Expo 2006: Power for Land, Sea & Air, Barcelona, Spain, May 8-11, 2006, pp. 1-9.

Hawkins, Larry et al., "*Development of an AMB Energy Storage Flywheel for Commercial Application,*" International Symposium on Magnetic Suspension Technology, Dresden, Germany, Sep. 2005, 5 pages.

Hawkins, Larry et al., "*Development of an AMB Energy Storage Flywheel for Industrial Applications,*" 7th International Symposium on Magnetic Suspension Technology, Fukoka, Japan, Oct. 2003, 8 pages.

Hawkins, Lawrence et al., "*Shock and Vibration Testing of an AMB Supported Energy Storage Flywheel,*" 8th International Symposium on Magnetic Bearings, Mito, Japan, Aug. 26-28, 2002, 6 pages.

McMullen, Patrick T. et al., "*Combination Radial-Axial Magnetic Bearing,*" Seventh International Symposium on Magnetic Bearings, ETH Zurich, Aug. 23-25, 2000, pp. 473-478.

McMullen, Patrick et al., "*Flywheel Energy Storage System with AMB's and Hybrid Backup Bearings,*" Tenth International Symposium on Magnetic Bearings, Martigny, Switzerland, Aug. 21-23, 2006, 6 pages.

Hawkins, Lawrence A. et al., "*Application of Permanent Magnet Bias Magnetic Bearings to an Energy Storage Flywheel,*" Fifth Symposium on Magnetic Suspension Technology, Santa Barbara, CA, Dec. 1-3, 1999, pp. 1-15.

\* cited by examiner

COMMUNICATING MAGNETIC FLUX ACROSS A GAP WITH A ROTATING BODY

BACKGROUND

This disclosure relates to generating electromagnetic forces and supporting a body, at least in part, by a magnetic field.

Equipment and machinery often contain moving (e.g. rotating) members, which require support during operation. A bearing, or similar device, may be used to support the moving member. Although many types of bearings require direct contact with the member to provide the necessary support, some applications benefit from or require non-contact, or nearly non-contact support for the member. A magnetic bearing uses a magnetic field to apply force to, and thereby support, the moving member in a non-contact, or nearly non-contact, manner. The non-contact or nearly non-contact support provided by the magnetic bearing can provide frictionless or nearly frictionless movement of the member. Should a machine include a member with varying dimensions, the bearing used for support, regardless of its type, may require a custom design or additional construction considerations in order to assemble the machine with the bearing. Therefore, the manufacture of the machine utilizing such a magnetic bearing may be inefficient due to the unique bearing design.

SUMMARY

This disclosure relates to generating electromagnetic forces and supporting a body, at least in part by a magnetic field.

In one implementation, an electromagnetic actuator includes a body having a rotational axis, a first pole adjacent an end facing surface of the body and adapted to communicate magnetic flux with the end facing surface of the body, and a second pole adjacent a lateral facing surface of the body and adapted to communicate magnetic flux with the lateral facing surface of the body. The body, the first pole, and the second pole are magnetically coupled and define an axial magnetic control circuit. The electromagnetic actuator also includes a plurality of radial poles adjacent the lateral facing surface of the body and adapted to communicate magnetic fluxes with the lateral facing surface of the body. The body and the plurality of radial poles are magnetically coupled and define a plurality of radial magnetic control circuits. Also, the plurality of radial poles are adapted to communicate magnetic fluxes with the lateral facing surface of the body and at least one of the first pole or the second pole. The body, the plurality of radial poles, and at least one of the first pole or the second pole define a magnetic bias circuit.

Implementations can include one or more of the following features. For example, three or more radial poles can be provided. The magnetic bias circuit can include a radial magnetic bias circuit and an axial magnetic bias circuit. The first pole can be oriented towards the end facing surface of the body, and the second pole can be oriented towards the lateral facing surface of the body. The end facing surface of the body can be orthogonal to the rotational axis. The body can include a low reluctance target adapted to communicate magnetic flux. An axial coil can be provided that is adapted to produce a magnetic flux in the axial magnetic control circuit and a plurality of radial coils can be provided that are adapted to produce magnetic fluxes in the plurality of radial magnetic control circuits. The magnetic flux entering the end facing surface of the body can exert an axial force on the body and the magnetic fluxes entering the lateral surface of the body can exert radial forces on the body. A plurality of corresponding radial control currents can generate the magnetic fluxes in the plurality of radial magnetic control circuits, and the radial forces can be linearly proportional to the plurality of corresponding radial control currents. At least one of the first pole or the second pole can include a circular ring. One or more permanent magnets can be provided that are adapted to produce a magnetic flux in the magnetic bias circuit. The permanent magnets can include at least one of a neodymium iron boron magnet a samarium cobalt magnet, or other magnetic material. The permanent magnets can include at least one of an axially magnetized permanent magnet or a radially magnetized permanent magnet.

In another implementation, a rotating machine system includes a body having a rotational axis, an electromagnetic actuator sub-assembly, one or more position sensors, and at least one control electronics package. The electromagnetic actuator sub-assembly includes a first pole adjacent an end facing surface of the body and adapted to communicate an axial control magnetic flux with the end facing surface of the body, a second pole adjacent a lateral facing surface of the body and adapted to communicate the axial control magnetic flux with the lateral facing surface of the body, and a plurality of radial poles adjacent the lateral facing surface of the body. The plurality of radial poles are adapted to communicate a plurality of radial control magnetic fluxes with the lateral facing surface of the body and also adapted to communicate bias magnetic flux with the lateral facing surface of the body and at least one of the first pole or the second pole. The body, the first pole, and the second pole are magnetically coupled and define an axial magnetic control circuit. The body and the plurality of radial poles are magnetically coupled and define a plurality of radial magnetic control circuits. Additionally, the body, the plurality of radial poles, and at least one of the first pole or the second pole define a magnetic bias circuit.

Implementations can include one or more of the following features. For example, a second electromagnetic actuator sub-assembly can be provided. The first electromagnetic actuator sub-assembly can be adapted to produce an axial force on the body in a first direction as a function of a first control current, and the second electromagnetic actuator sub-assembly can be adapted to produce an opposing axial force on the body as a function of a second control current. The second control current can be substantially equal in magnitude and opposite in direction to the first control current. The axial force and the opposing axial force may produce a net axial force on the body. Furthermore, the net axial force may be linearly proportional to the magnitude of the first and second control currents. The body can be coupled to a driven load. The driven load may include at least one of a flywheel, a compressor, a generator, or an expander. In additional aspects, the body is coupled to a driver. The driver may include at least one of a motor, an engine, or a turbine.

All or some or none of the described implementations may have one or more of the following features or advantages. For example, the electromagnetic actuator may produce the required force with minimal power consumption. In addition, the required force produced by the electromagnetic actuator is linearly proportional to a corresponding control current, which may simplify the control of the electromagnetic actuator and achieve a better system dynamic and higher control quality. Furthermore, the electromagnetic actuator may possess low rotational losses. As another example, the electromagnetic actuator may have a compact and low weight design. The rotating body should have components mounted on it with minimal size and weight in order to increase the frequency of the first natural bending mode of the body, which, in some aspects, limits vibrations caused by the body's imbalance as it rotates at a high rotational speed. Finally, the electromagnetic actuator may allow the construction of the body in the form of a rotor that has a gradually decreasing rotor diameter from the rotor center of gravity toward the rotor ends; this also may increase the frequency of the first natural bending mode of the body, which limits vibrations caused by the body's imbalance as it rotates at a high rotational speed.

Additionally, all or some or none of the described implementations may have one or more of the following features or advantages. For example, the electromagnetic actuator can be assembled to the rotating body without substantial disassembly of the electromagnetic actuator by sliding the electromagnetic actuator over the target of the rotating body (or the target of the rotating body into the electromagnetic actuator). This reduces manufacturing and repair costs of machines using the electromagnetic actuator, because the machine may be more easily assembled and disassembled. Two of the same electromagnetic actuators can be used in supporting the rotating body, thus also reducing manufacturing and repair costs. The rotating body need not include a reduction in transverse dimension inboard of the target to accommodate an inboard axial control pole of the electromagnetic actuator. Accordingly, any impact on dynamic performance caused by the reduction in transverse dimension can be reduced or eliminated. Additionally, the electromagnetic actuator can produce axial and radial forces with only one feature, the target, installed on the rotating body and using only one bias field, thus minimizing the weight and size of components mounted on the rotating body. A portion of the magnetic field required to produce electromagnetic force can be generated by permanent magnets, rather than electromagnets, thus reducing power consumption of the electromagnetic actuator. Furthermore, the electromagnetic actuator may utilize modern rare-earth permanent magnets with high energy densities, thus allowing for a compact and low weight design. Also, the electromagnetic actuator may introduce a bias magnetic field, which allows for the produced force to be controlled in proportion to a corresponding current. Finally, the magnetic field around the target can be uniform or nearly uniform, in the absence or radial loading, thus reducing eddy current losses induced by rotation of the rotating body, even if the target is conductive, as in some aspects. In the presence of radial loadings, the electromagnetic actuator may exhibit minimal rotational losses, which can be further reduced by making at least a portion of the target laminated.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

This disclosure provides various implementations for generating electromagnetic forces and supporting a body, at least in part by a magnetic field. In certain implementations, electromagnetic force may be exerted on a rotating body by an electromagnetic actuator, alone or in combination with other electromagnetic actuators or other types of bearings, bushings, or other mechanisms. The electromagnetic actuator utilizes a magnetic field to, for example, exert force on the body. The force may be used in supporting the body. In certain applications, the electromagnetic actuator is part of an active magnetic bearing. The magnetic bearing is active in that a system of sensors and feedback control electronics operate to vary currents in the electromagnetic actuator to control the supporting forces applied to the rotating body and maintain the rotating body in position under various loading conditions. The position of the rotating body, or portion of the rotating body, may be constantly monitored through the use of position sensors in some aspects. In certain implementations, the electromagnetic actuator is controlled to support the rotating body as the body rotates about an axis. However, the concepts described can be applied to systems that allow other types of movement besides rotation.

Figure 1:
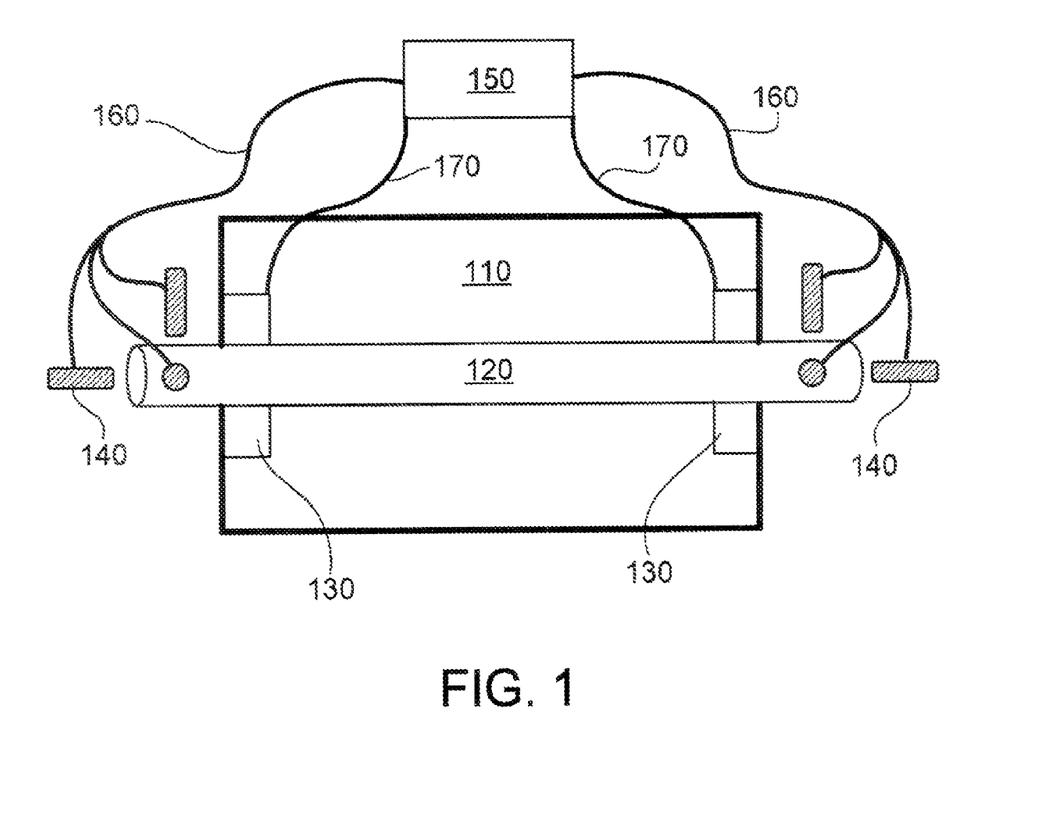
FIG. 1 illustrates a rotating machine system incorporating one implementation of an electromagnetic actuator.

FIG. 1 illustrates an example rotating machine system. Rotating machine 110 includes a rotating body 120 and one or more electromagnetic actuators 130. Although illustrated as a single body here, it is contemplated that rotating machine 110 may include multiple rotating bodies 120. Furthermore, although two electromagnetic actuators 130 are illustrated in FIG. 1, fewer or greater than two actuators 130 may be utilized as appropriate in the application. In certain implementations, one or more electromagnetic actuators 130 can be used together with one or more other types of bearings, bushings or other support mechanisms. Although electromagnetic actuators 130 are shown internal to the rotating machine 110, these systems may be implemented within the structural enclosure of the rotating machine 110 or exterior to the structure, as required by the particular application.

Position sensors 140, as illustrated, sense displacement of the body 120. In FIG. 1, three position sensors 140 are located at each end of body 120 to sense displacement in three dimensions. In other implementations, a fewer or greater number of position sensors 140 may be utilized. Position sensors 140 are coupled to control electronics 150 by signal paths 160. Control electronics 150 receive signals from position sensors 140 and control the operation of electromagnetic actuators 130 relative to the signals. Control electronics 150 communicate with electromagnetic actuators 130 through signal paths 170. Although shown exterior to the structure of rotating machine 110, position sensors 140, signal paths 160 and 170, and control electronics 150 may be internal to rotating machine 110. An active magnetic bearing may include an electromagnetic actuator 130, control electronics 150, and associated position sensors 140.

The rotating machine 110 may be, for example, a motor, a generator, or a motor-generator, which as a motor receives electricity and produces kinetic energy (movement) or as a generator produces electricity from kinetic energy. Another example of rotating machine 110 is a motor-compressor set, which operates to compress any appropriate gas for a number of applications. For instance, the motor-compressor set may compress a petroleum by-product, refrigerant vapor, or ammonia, to name only a few. In another example, rotating machine 110 may be a turbine (or expander)-generator set, which expands a gas to drive a generator and produce electricity. In yet another example, rotating machine 110 is a flywheel device that stores kinetic energy.

Rotating body 120, as illustrated in FIG. 1, is supported by one or more electromagnetic actuators 130 to rotate about its longitudinal axis. Although shown as a shaft, or cylindrical body in FIG. 1, the present disclosure contemplates that rotating body 120 may be one of a variety of shaped structural members. In some implementations, the shaft diameter may be variable along the length of the shaft. Furthermore, for example, rotating body 120 may be a hollow shaft, with both a circular inner and outer diameter. Although illustrated as internal to rotating machine 110, rotating body 120 may reside external to the structural enclosure of the machine.

Figure 2A:
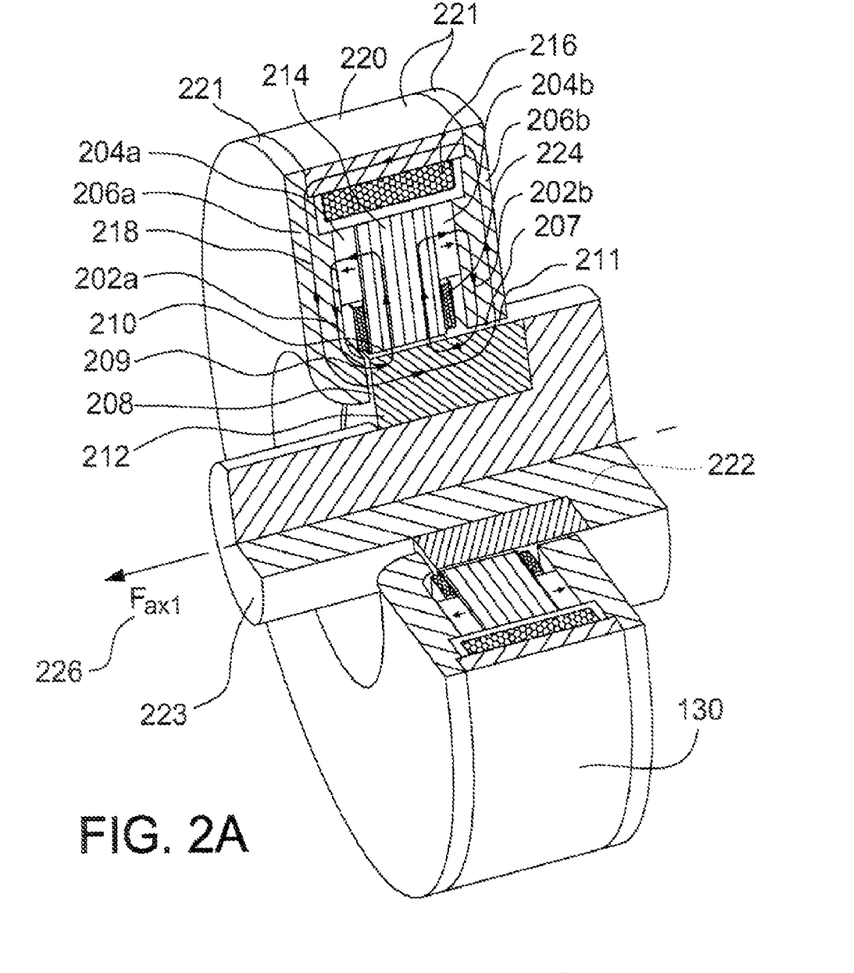
FIG. 2A illustrates one implementation of the electromagnetic actuator.

FIG. 2A illustrates one implementation of the electromagnetic actuator 130 described in the present disclosure. The electromagnetic actuator 130 is structurally enclosed by an axial control pole 206a, a passive radial pole 206b, and an axial back iron 220. In this implementation, rotating body 120 is a shaft 222 with a reduced diameter outboard stub 223. The stub 223, however, may be omitted in other implementations. A magnetic axial control flux 218, produced by axial control winding 216, is illustrated as conducting through various components within the electromagnetic actuator 130, for example, axial control pole 206a, passive radial pole 206b, axial back iron 220, and an actuator target 212.

Figure 2B:
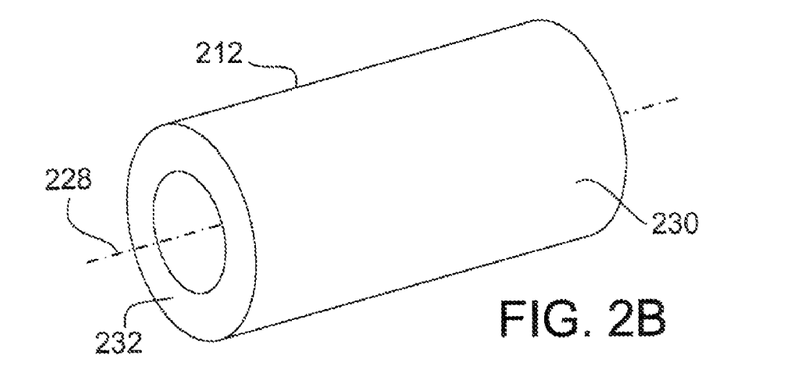
FIG. 2B illustrates an additional view of an actuator target.

Electromagnetic actuator 130 utilizes at least two independent magnetic control circuits such that unidirectional axial forces and bidirectional radial forces are applied to actuator target 212. For example, an axial magnetic control circuit and a radial magnetic control circuit may be used to produce such forces. The axial magnetic control circuit includes actuator target 212 and a stationary portion 221, which includes axial control pole 206a and passive radial pole 206b. The axial control pole 206a and passive radial pole 206b may be magnetically linked through axial back iron 220. Axial control pole 206a has a surface 209 concentric with actuator target 212 and separated from target 212 by axial air gap 208. Passive radial pole 206b also has a surface 207 concentric with actuator target 212 and separated from target 212 by radial air gap 211. In some aspects, axial air gap 208 and radial air gap 211 may be uniform or substantially uniform circumferentially. Referring briefly to FIG. 2B, the concentric surface 209 of axial control pole 206a is adjacent to an axial target surface 232. Axial target surface 232 yields a non-zero projection on any plane normal to symmetry axis 228. Furthermore, the concentric surface 207 of passive radial pole 206b is adjacent to a radial target surface 230. Radial target surface 230 yields a non-zero projection on any plane encompassing symmetry axis 228. Concentric surfaces 207 and 209 may be substantially planar, or for example, may be conical or any other rotational shape. Magnetic forces may develop on the axial target surface 232 and radial target surface 230. The axial magnetic control circuit is energized by axial control coil 216 wound around the actuator target axis 228 and encompassed by the axial magnetic control circuit, such that magnetic axial control flux 218 is induced in the axial magnetic control circuit upon a flow of current through coil 216.

The radial magnetic control circuit includes actuator target 212 and a stationary portion 214, including radial control poles 225 and associated radial control coils 224. Radial control poles 225 (shown in FIG. 3) are separated from actuator target 212 by radial air gap 210. In some aspects, radial air gap 210 may be uniform or substantially uniform circumferentially.

Bias permanent magnets 204a and 204b produce a difference in scalar magnetic potentials between the stationary portions of the axial and radial magnetic control circuits, 221 and 214, respectively. Furthermore, permanent magnets 204a and 204b may have a high reluctance for magnetic flux. For example, magnets 204a and 204b may be modern high-energy rare-earth magnets, such as Neodymium Iron Boron (NdFeB) or Samarium Cobalt (SmCo). Therefore, the stationary portions of the axial and radial magnetic control circuits remain magnetically isolated from each other. Thus, axial magnetic control flux 218 cannot leak into the stationary portion of the radial magnetic control circuit 214, and radial control flux (shown in FIG. 3) cannot leak into the stationary portion of the axial magnetic control circuit 221. In other implementations, the difference in scalar magnetic potentials between the stationary portions of the axial and radial control circuits, 221 and 214 respectively, may be produced by other devices, for example, electromagnetic coils.

Upon introduction of actuator target 212, the difference in scalar magnetic potentials results in two constant magnetic bias fluxes 202a and 202b. Bias fluxes 202a and 202b pass through various components of electromagnetic actuator 130. For example, bias magnetic flux 202a travels through axial control pole 206a towards axial air gap 208 and crosses gap 208 to enter actuator target 212 from axial target surface 232 (as illustrated in FIG. 2B). From target 212, magnetic bias flux 202a travels through radial air gap 210 and enters the stationary portion of radial magnetic control circuit 214. Bias magnetic flux 202a travels then to permanent magnet 204a to close the loop. Similarly, bias magnetic flux 202b travels through passive radial pole 206b, crosses radial air gap 211, and enters actuator target 212 from the radial target surface 230 (as illustrated in FIG. 2B). From target 212, magnetic bias flux 202b travels across radial air gap 210 and enters the stationary portion of radial magnetic control circuit 214, where it propagates within it towards permanent magnet 204b, where it closes the loop. Radial air gaps 210 and 211 and axial air gap 208 provide for non-contact or nearly non-contact (and correspondingly frictionless or near-frictionless) support of shaft 222 during operation of electromagnetic actuator 130.

Figure 2C:
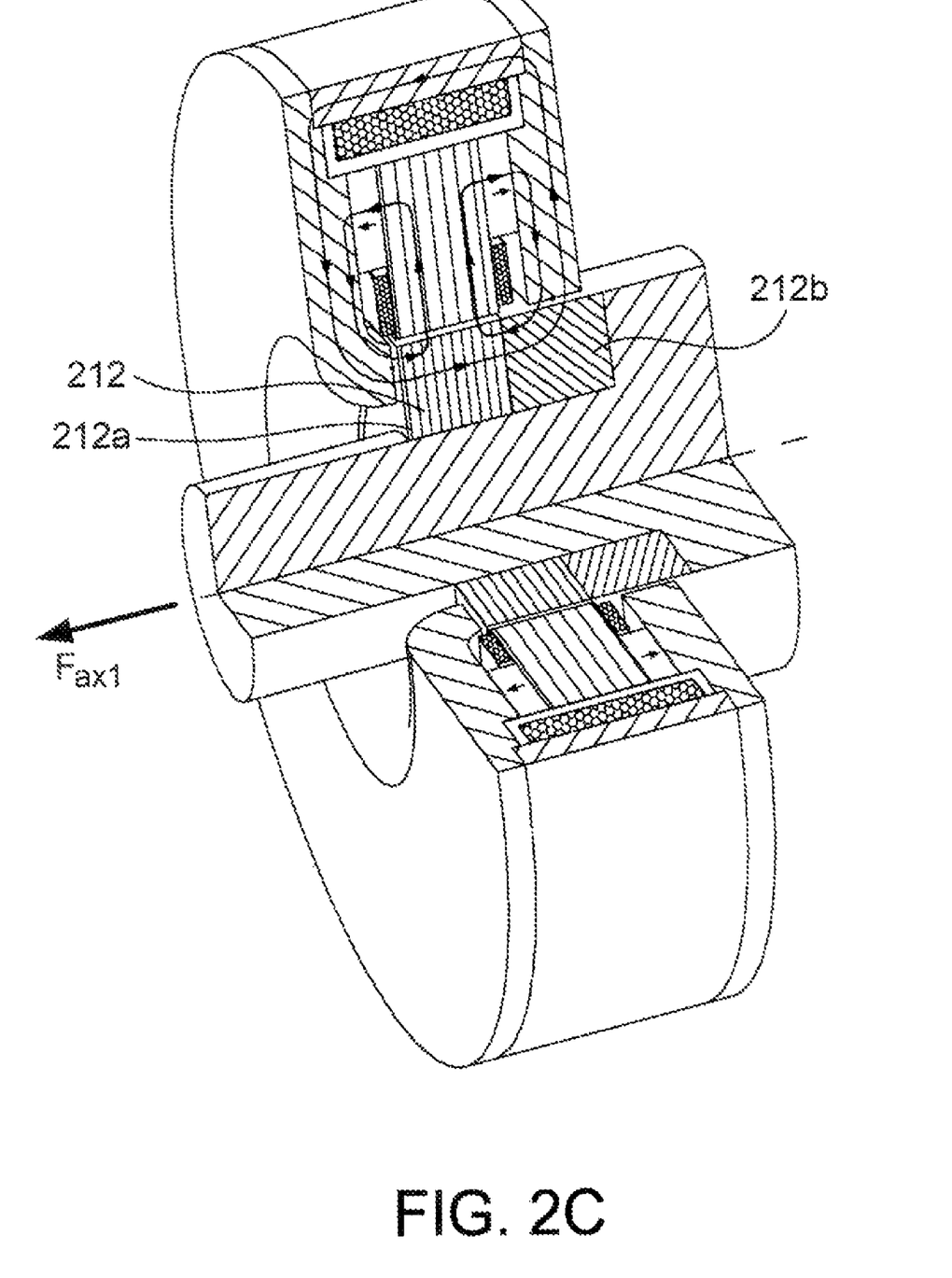
FIG. 2C illustrates an alternate implementation of the actuator target.

In some implementations, actuator target 212 is separately constructed and rigidly attached to shaft 222. In other implementations, some or all of the actuator target 212 can be integral to or integrally formed with the shaft 222. The actuator target 212 and, in some implementations, at least a portion of the shaft 222 adjacent the actuator target 212 are a low reluctance material, for conducting bias fluxes 202a and 202b. If there are no currents in the radial control coils 224, the bias magnetic fluxes 202a and 202b, as well as the axial control flux 218, are uniform or substantially uniform circumferentially within actuator target 212. Therefore, any point of the actuator target 212 does not experience a magnetic flux variation upon rotation, which, in certain aspects with a conductive target, may otherwise induce eddy-current losses, producing an equivalent of the friction in mechanical bearings. The eddy currents are induced when there are currents in the radial control coils 224 producing radial force on the actuator target 212, since the radial control magnetic flux (illustrated in FIG. 3) may not be substantially uniform circumferentially. At least a portion, 212a, of the actuator target 212 magnetically linked with the stationary radial magnetic control circuit 214 may be composed of thin electrically-isolated laminates stuck together axially as shown in FIG. 2C. Another portion 212b of actuator target 212 magnetically linked with passive radial pole 206b may be non-laminated but magnetically permeable. This portion 212b may be integral to the shaft 222 if, for example, shaft 222 is magnetically permeable.

Axial control winding 216 carries the axial control current. This current produces magnetic axial control flux 218, which either adds to or subtracts from the bias magnetic flux 202a in axial air gap 208. Magnetic axial control flux 218 passes through the axial control pole 206a, passive radial pole 206b, axial back iron 220, axial air gap 208, actuator target 212, and radial air gap 211. As there is only one axial air gap 208, the magnetic force $F_{ax1}$ 226 can be produced only in one direction, aiming to reduce the gap 208.

Continuing further with FIG. 2A, the axial force 226 acting on actuator target 212 is proportional to the second power of the net magnetic flux density in the axial air gap 208. If the density of the bias flux 202a in axial air gap 208 is designated as $B0_{ax}$, and the density of control flux 218 in axial air gap 208 is designated as $B1_{ax}$, then axial force $F_{ax1}$ 226 may be calculated as:

$$F_{ax1} = \frac{1}{2\mu_0}(B0_{ax} + B1_{ax})^2 \cdot A_{ax},$$

where $\mu_0 = 4\pi \cdot 10^{-7}$ H/m is the permeability of a vacuum in SI units and $A_{ax}$ is the area of the axial projection of axial control pole 206a on the surface of actuator target 212. Because the density of the control flux $B1_{ax}$ is linearly proportional to the axial control current in axial control coil 216, the axial force 226 is a quadratic function of the axial control current.

Magnetic bias fluxes 202a and 202b, as well as magnetic control flux 218, do not yield a net radial force when the actuator target 212 is centered radially, because these fluxes are distributed uniformly or substantially uniformly around the circumference of actuator target 212. By varying the axial control current in axial control winding 216, and, consequently, the axial control flux 218, the magnitude of the axial force $F_{ax1}$ 226 may be varied, and thus controlled. With the actuator target 212 rigidly mounted on or integral to shaft 222, all forces exerted on the target 212 are directly transferred to shaft 222. Electromagnetic actuator 130 may produce controllable radial forces through the introduction of radial control magnetic fluxes produced by radial control windings 224 and the stationary portion of the radial magnetic control circuit 214, as described in FIG. 3.

Figure 3:
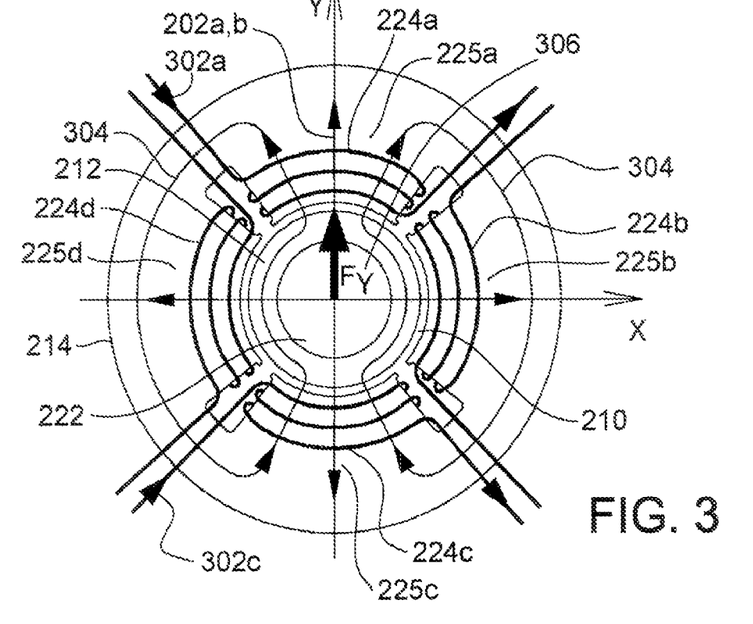
FIG. 3 illustrates one implementation of a radial pole assembly and control windings.

FIG. 3 illustrates an example implementation of the stationary portion of the radial magnetic control circuit 214 utilizing four radial control windings 224a through 224d, as viewed axially. The radial control poles 225a through 225d, around which the windings 224a through 224d are wound, are situated evenly around actuator target 212 and magnetically linked to each other. Furthermore, the radial control poles 225a through 225d have surfaces concentric with actuator target 212, adjacent to radial target surface 230 (as shown in FIG. 2B), and separated from target 212 by radial air gap 210. In some implementations, a fewer or greater number of radial control poles 225 may be utilized. The magnetic bias fluxes 202a and 202b generated by permanent magnets 204a and 204b add in the stationary portion of the radial magnetic control circuit 214 and flow radially. When the actuator target 212 is centrally positioned and there are no currents in the radial control windings 224a through 224d, the bias flux density under each pole 225a through 225d associated with windings 224a through 224d is equal because of the symmetrical nature of the system. Therefore, there is no radial force produced on actuator target 212 by the stationary portion of the radial magnetic control circuit 214.

Continuing with FIG. 3, by energizing some of the radial control windings, 224a through 224d, the flux distribution may be altered so as to develop a radial force. For example, FIG. 3 shows windings 224a and 224c energized with control currents 302a and 302c, respectively. These currents produce radial control flux 304. In the portion of radial air gap 210 located between the pole 225a and actuator target 212, control flux 304 adds to the combined magnetic bias fluxes 202a and 202b. Conversely, radial control flux 304 subtracts from the combined magnetic bias fluxes 202a and 202b within the portion of radial air gap 210 located between the radial control pole 225c and actuator target 212. Due to the higher magnetic flux density between actuator target 212 and radial control pole 225a as compared to the magnetic flux density between target 212 and radial control pole 225c, radial electromagnetic force $F_Y$ 306 acts on actuator target 212. As shown in FIG. 3, this force $F_Y$ 306 is directed upward.

Continuing with FIG. 3, the portion of the electromagnetic force $F_Y$ 306 exerted on the actuator target 212 by the upper pole 225a associated with winding 224a can be calculated as $$f_{rad1} = \frac{1}{2\mu_0}(B0_{rad} + B1_{rad})^2 \cdot A_{rad},$$

where $B0_{rad}$ is the density of the combined bias fluxes 202a and 202b in radial gap 210, $B1_{rad}$ is the density of the radial control flux 304 in the portions of the radial gap 210 associated with windings 224a and 224c, and $A_{rad}$ is the projection of the upper (or lower) pole surface adjacent to the radial air gap 210 on a plane normal to the pole axis (Y axis as illustrated in FIG. 3).

Similarly, the electromagnetic force exerted on the actuator target 212 by the lower pole 225c associated with winding 224c can be calculated as:

$$F_{rad2} = \frac{1}{2\mu_0}(B0_{rad} - B1_{rad})^2 \cdot A_{rad}.$$

The net radial force on the shaft 222 will then be:

$$F_{rad} = F_{rad1} - F_{rad2}$$
$$= \frac{A_{rad}}{2\mu_0}\{(B0_{rad} + B1_{rad})^2 - (B0_{rad} - B1_{rad})^2\}$$
$$= 2\frac{A_{rad}}{\mu_0}B0_{rad}B1_{rad}$$

If both radial control currents 302a and 302c are equal to a radial control current $I_{rad}$, the radial control magnetic flux density $B1_{rad}$ will be linearly proportional to the radial control current $I_{rad}$, and consequently, the radial force $F_{rad}$ will be linearly proportional to $I_{rad}$. Although illustrated and describe above in the Y direction, the same features apply in the X direction. Therefore, this implementation allows the electromagnetic actuator 130 to produce bidirectional electromagnetic forces along two radial axes, designated in FIG. 3 as X and Y.

Figure 4:
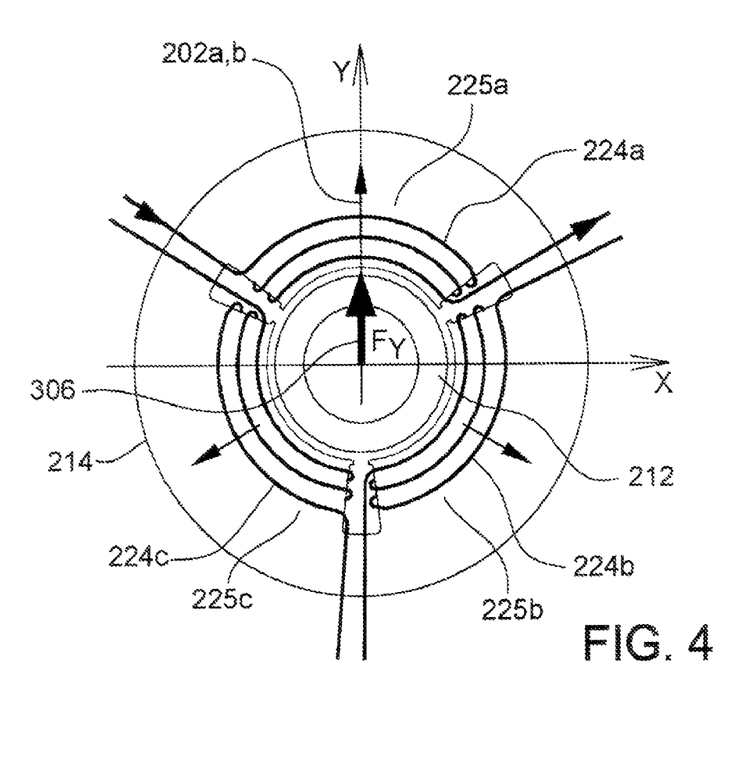
FIG. 4 illustrates another implementation of the radial pole assembly and control windings.

FIG. 4 illustrates another example implementation of the stationary portion of the radial magnetic control circuit 214 utilizing three radial control windings 224, as viewed axially. The radial forces are produced in a substantially similar manner to the implementation described in FIG. 3. For example, one radial control winding 224a may be energized with a control current, thereby producing a radial control flux. The control flux adds to the combined bias fluxes 202a and 202b in the portion of radial air gap 210 under radial control pole 225a, while subtracting from the combined bias fluxes 202a and 202b in the portions of radial air gap 210 under radial control poles 225b and 225c. This results in a radial force 306 directed towards the pole 225a associated with winding 224a. Referring to FIGS. 3 and 4, while these implementations may affect the radial axes control and the radial pole construction, they do not affect the axial pole system and its control, nor the permanent magnet bias system and its construction.

Figure 5:
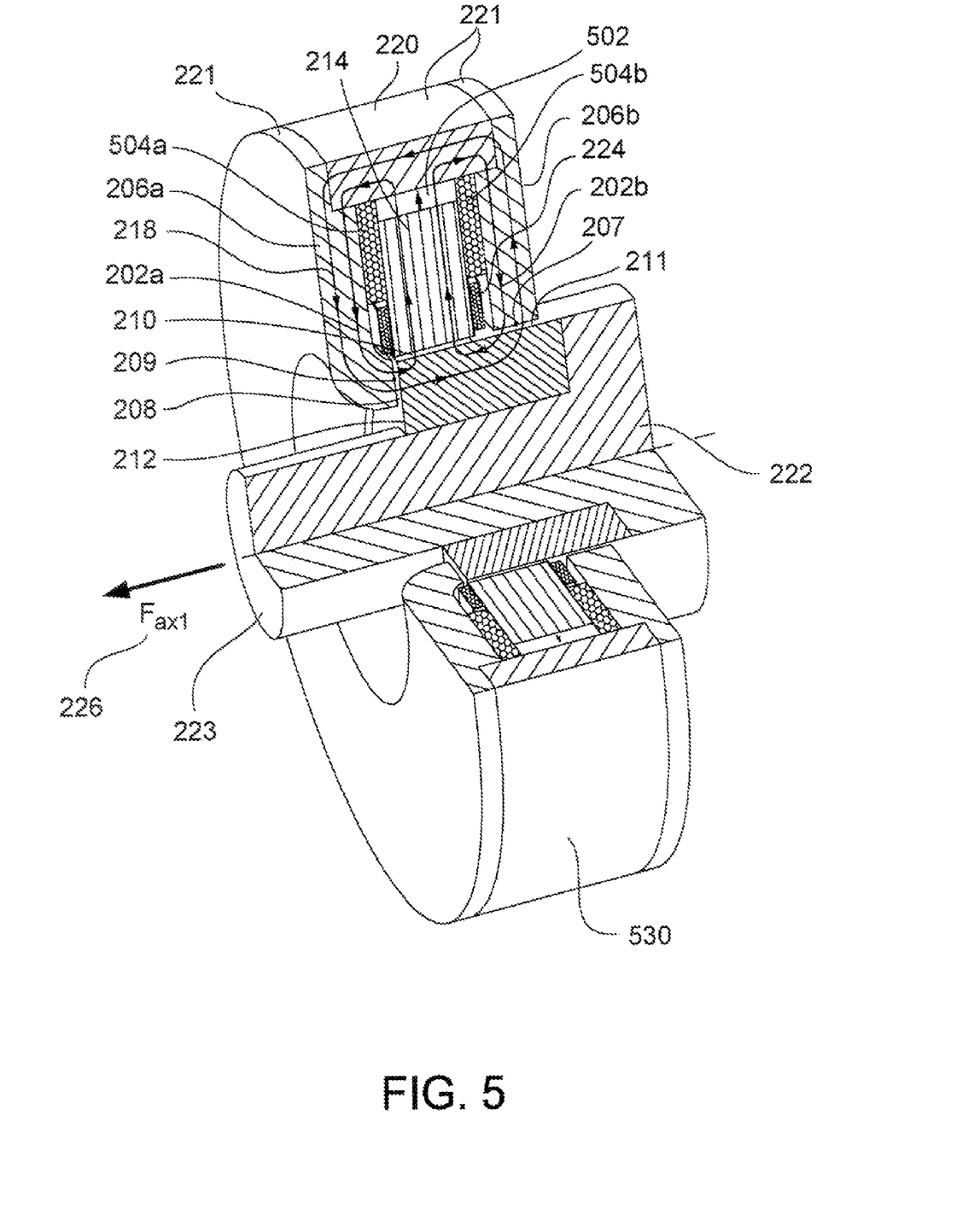
FIG. 5 illustrates another implementation of the electromagnetic actuator.

FIG. 5 illustrates another implementation of the electromagnetic actuator described in the present disclosure. This implementation 530 differs from the implementation shown and described in FIG. 2A, however, this disclosure contemplates that electromagnetic actuator 530 may be utilized in any application suitable for electromagnetic actuator 130, including, for example, the rotating machine 110 illustrated in FIG. 1. For example, the generation of magnetic bias and control flux may be accomplished differently in FIG. 5. Referring to FIG. 2A, bias fluxes 202a and 202b are generated, for example, by axially magnetized permanent magnets 204a and 204b, while the control flux 218 is generated by the axial control winding 216. Conversely, as illustrated in FIG. 5, the magnetic bias fluxes 202a and 202b are generated by a radially magnetized permanent magnet 502. Although illustrated as a single radially magnetized permanent magnet 502, multiple radially magnetized permanent magnets 502 may be utilized. Furthermore, axial control winding 216, as illustrated in FIG. 2A, is substituted with axial control coils 504a and 504b, which may utilize space more efficiently. Although illustrated in FIG. 5 as two coils, 504a and 504b, one coil 504a or 504b may be utilized. Although the component arrangements differ between electromagnetic actuators 130 and 530, the operation of the two electromagnetic actuators (130 and 530) is substantially similar.

Figure 6:
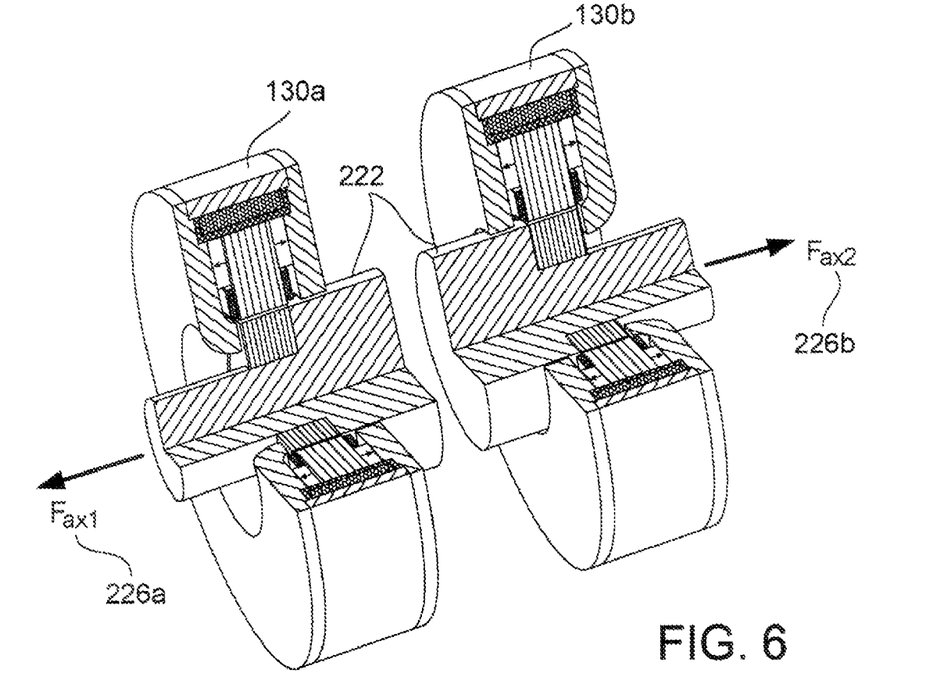
FIG. 6 illustrates an example system to support a rotating body through the use of one or more implementations in accordance with the concepts described herein.

FIG. 6 illustrates an example system to support the rotating member through the use of one or more implementations of the present disclosure. As shown, this system includes electromagnetic actuators 130a and 130b coupled to both ends of the continuous shaft 222. When one or more position sensors (not shown) and one or more control electronics (not shown) are utilized, these actuators form an active magnetic bearing system capable of providing non-contact or nearly non-contact, and thus frictionless or nearly frictionless, support for shaft 222. The position sensors detect deflection of the shaft 222 from a required position and provide the deflection information to the control electronics, which generate electrical currents for electromagnetic actuators 130a and 130b in order to produce forces necessary to keep the shaft 222 in the required position. Electromagnetic actuator 130, as described in the present disclosure, may be coupled to shaft 222 as shown; however, electromagnetic actuator 530 may also be utilized.

The system in FIG. 6 allows for axial force to be applied to shaft 222 in either direction through the use of two or more electromagnetic actuators 130 (or 530, as appropriate). For example, if the magnitudes and the directions of the axial control currents in the electromagnetic actuators 130a and 130b in FIG. 6 are such that the force $F_{ax1}$ 226a produced by electromagnetic actuator 130a is higher than the force $F_{ax2}$ 226b produced by electromagnetic actuator 130b, there will be a net axial force directed as $F_{ax1}$ 226a. Conversely, should the force $F_{ax2}$ 226b produced by electromagnetic actuator 130b be greater than force $F_{ax1}$ 226a, there will be net axial force directed as $F_{ax2}$ 226b. Furthermore, should equal axial control currents flow in the electromagnetic actuators 130a and 130b and their parameters are identical, a net axial force of zero acts on shaft 222, since the forces $F_{ax1}$ and $F_{ax2}$ counteract each other.

Continuing with FIG. 6, the axial force $F_{ax1}$ exerted by electromagnetic actuator 130a can be calculated as:

$$F_{ax1} = \frac{1}{2\mu_0}(B0_{ax} + B1_{ax})^2 \cdot A_{ax}.$$

If electromagnetic actuator 130b has an identical design and is supplied with axial control current of the same magnitude as actuator 130a but the opposite direction, the electromagnetic axial force $F_{ax2}$ that actuator 130b exerts on the shaft 222 can be calculated as:

$$F_{ax2} = \frac{1}{2\mu_0}(B0_{ax} - B1_{ax})^2 \cdot A_{ax}.$$

Therefore, the net force, $F_{ax}$, that the two actuators, 130a and 130b, exert on shaft 222 can be calculated as:

$$F_{ax} = F_{ax1} - F_{ax2}$$
$$= \frac{A_{ax}}{2\mu_0}\{(B0_{ax} + B1_{ax})^2 - (B0_{ax} - B1_{ax})^2\}$$
$$= 2\frac{A_{ax}}{\mu_0}B0_{ax}B1_{ax}.$$

Although the axial force produced by each individual actuator, 130a or 130b, is a quadratic function of the control flux density $B1_{ax}$, the net axial force on the rotor is linearly proportional to $B1_{ax}$, which is also linearly proportional to the axial control current in the electromagnetic actuators 130a and 130b. Together, electromagnetic actuators 130a and 130b may produce net axial force in any direction, as well as a torque about any axis except for the rotation axis of shaft 222. Therefore, all degrees of freedom of the shaft 222 except for the rotation about its axis may be controlled, while the rotation about the axis is frictionless or nearly frictionless.

Figure 7:
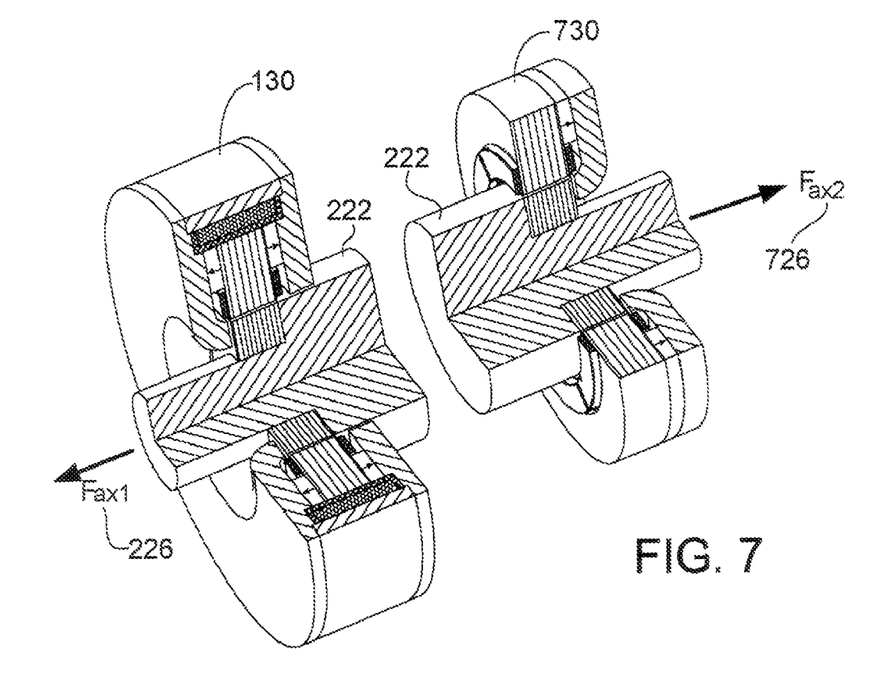
FIG. 7 illustrates another example system to support the rotating body through the use of one or more implementations in accordance with the concepts described herein.

FIG. 7 illustrates another example system to support a rotating member through the use of one or more implementations of the present disclosure. Electromagnetic actuator 130, as described in the present disclosure, may be coupled to shaft 222 as shown; however, electromagnetic actuator 530 may also be utilized. Furthermore, another type of electromagnetic actuator 730 may be coupled to shaft 222 opposite to the presently disclosed electromagnetic actuator. Electromagnetic actuator 730 operates to provide radial support of the corresponding end of shaft 222 and produce a force $F_{ax2}$ 726. This force can be counteracted by the controllable force $F_{ax1}$ 226 generated by electromagnetic actuator 130 or 530. If the magnitude of $F_{ax1}$ 226 is less than that of $F_{ax2}$ 726, the net force would be directed as $F_{ax2}$ 726. Conversely, if the magnitude of $F_{ax1}$ 226 exceeds that of $F_{ax2}$ 726, the net force will be directed as $F_{ax1}$ 226. The system of FIG. 7 is also applicable to instances where another type of bearing, bushing, or other support mechanism, including those without provisions to control the axial force exerted by the support mechanism (e.g. ball bearing systems, thin fluidic film bearing systems, and others), can be substituted for electromagnetic actuator 730.

As illustrated in FIGS. 6 and 7, electromagnetic actuator 130 or 530 may slide on or off of shaft 222 without disassembly. Thus, assembly (or disassembly) of rotating machine 110 utilizing electromagnetic actuators 130 or 530 may be accomplished by sliding the stationary portions of electromagnetic actuators 130 or 530 over shaft 222 without any disassembly or further modification to electromagnetic actuators 130 or 530. Additionally, although FIGS. 6 and 7 illustrate electromagnetic actuators 130 or 530 as external to shaft 222, actuators 130 or 530 may operate inside the support structure.

A number of implementations have been described. Nevertheless, it will be understood that various modifications may be made. Accordingly, other implementations are within the scope of the following claims.

What is claimed is:

1. An electromagnetic actuator comprising:
a body having a rotational axis;
a first pole residing apart from the body, the first pole adjacent an end facing surface of the body and adapted to communicate magnetic flux across a gap with the end facing surface of the body;
a second pole adjacent a lateral facing surface of the body and adapted to communicate magnetic flux with the lateral facing surface of the body, the body, the first pole, and the second pole magnetically coupled and defining an axial magnetic control circuit; and
a plurality of radial poles adjacent the lateral facing surface of the body and adapted to communicate magnetic fluxes with the lateral facing surface of the body, the body and the plurality of radial poles magnetically coupled and defining a plurality of radial magnetic control circuits, the plurality of radial poles adapted to communicate magnetic fluxes with the lateral facing surface of the body and at least one of the first pole or the second pole, and the body, the plurality of radial poles, and at least one of the first pole or the second pole defining a magnetic bias circuit.

2. The actuator of claim 1 wherein the plurality of radial poles comprises three or more radial poles.

3. The actuator of claim 1 wherein the magnetic bias circuit is a radial magnetic bias circuit and an axial magnetic bias circuit.

4. The actuator of claim 1 wherein the first pole is oriented towards the end facing surface of the body and the second pole is oriented towards the lateral facing surface of the body.

5. The actuator of claim 1 wherein the end facing surface of the body is orthogonal to the rotational axis.

6. The actuator of claim 1 wherein the body has a low reluctance target, the target adapted to communicate magnetic flux.

7. The actuator of claim 1 further comprising an axial coil adapted to produce a magnetic flux in the axial magnetic control circuit and a plurality of radial coils adapted to produce magnetic fluxes in the plurality of radial magnetic control circuits.

8. The actuator of claim 7 wherein the magnetic flux entering the end facing surface of the body exerts an axial force on the body and the magnetic fluxes entering the lateral surface of the body exert radial forces on the body.

9. The actuator of claim 8 wherein a plurality of corresponding radial control currents generate the magnetic fluxes in the plurality of radial magnetic control circuits, and wherein the radial forces are linearly proportional to the plurality of corresponding radial control currents.

10. The actuator of claim 1 wherein at least one of the first pole or the second pole comprises a circular ring.

11. The actuator of claim 1 further comprising a permanent magnet adapted to produce a magnetic flux in the magnetic bias circuit.

12. The actuator of claim 11 wherein the permanent magnet comprises at least one of a neodymium iron boron magnet or a samarium cobalt magnet.

13. The actuator of claim 11 wherein the permanent magnet comprises at least one of an axially magnetized permanent magnet or a radially magnetized permanent magnet.

14. The actuator of claim 1, the second pole residing apart from the body and adapted to communicate magnetic flux with the lateral facing surface of the body across a second gap.

15. A method for exerting force on a body, the body configured to rotate, the method comprising:
communicating an axial magnetic flux across a gap between an end facing surface of a body and a first pole adjacent the end facing surface of the body and residing apart from the body, the body having a rotational axis;
communicating the axial magnetic flux between a lateral facing surface of the body and a second pole adjacent the lateral facing surface of the body, the body, the first pole, and the second pole magnetically coupled and defining an axial magnetic control circuit;
communicating radial magnetic flux between the lateral facing surface of the body and a plurality of radial poles adjacent the lateral facing surface of the body, the body and the plurality of radial poles magnetically coupled and defining a plurality of radial magnetic control circuits; and
communicating a bias magnetic flux between the plurality of radial poles, the lateral facing surface of the body, and at least one of the first pole or the second pole, the plurality of radial poles, the body, and at least one of the first pole or the second pole defining a magnetic bias circuit.

16. The method of claim 15 further comprising:
generating an axial force on the body with the axial magnetic flux; and
generating a radial force on the body with the radial magnetic flux.

17. The method of claim 16 further comprising:
producing at least one control current; and
controlling the axial force and the radial force by varying the control current.

18. A rotating machine system, the system comprising:
a body having a rotational axis;
an electromagnetic actuator sub-assembly comprising:
a first pole detached from the body, the first pole adjacent an end facing surface of the body and adapted to communicate an axial control magnetic flux with the end facing surface of the body across a gap disposed between the body and the first pole;
a second pole adjacent a lateral facing surface of the body and adapted to communicate the axial control magnetic flux with the lateral facing surface of the body, the body, the first pole, and the second pole magnetically coupled and defining an axial magnetic control circuit; and a plurality of radial poles adjacent the lateral facing surface of the body and adapted to communicate a plurality of radial control magnetic fluxes with the lateral facing surface of the body, the body and the plurality of radial poles magnetically coupled and defining a plurality of radial magnetic control circuits, the plurality of radial poles adapted to communicate bias magnetic fluxes with the lateral facing surface of the body and at least one of the first pole or the second pole, the body, the plurality of radial poles, and at least one of the first pole or the second pole defining a magnetic bias circuit;

one or more position sensors; and at least one control electronics package.

19. The system of claim 18 further comprising a second electromagnetic actuator sub-assembly, the first electromagnetic actuator sub-assembly adapted to produce an axial force on the body in a first direction as a function of a first control current and the second electromagnetic actuator sub-assembly adapted to produce an opposing axial force on the body as a function of a second control current, the second control current substantially equal in magnitude and opposite in direction to the first control current, the axial force and the opposing axial force producing a net axial force on the body, the net axial force linearly proportional to the magnitude of the first and second control currents.

20. The system of claim 18 wherein the body is coupled to a driven load, the driven load comprising at least one of a flywheel, a compressor, a generator, or an expander.

21. The system of claim 18 wherein the body is coupled to a driver, the driver comprising at least one of a motor, an engine, or a turbine.

* * * * *